(12) United States Patent
Ameling et al.

(10) Patent No.: US 8,749,499 B2
(45) Date of Patent: Jun. 10, 2014

(54) TOUCH SCREEN FOR BRIDGING MULTI AND/OR SINGLE TOUCH POINTS TO APPLICATIONS

(75) Inventors: Michael Ameling, Dresden (DE); Philipp Herzig, Oybin (DE)

(73) Assignee: SAP AG, Walldorf (DE)

( * ) Notice: Subject to any disclaimer, the term of this patent is extended or adjusted under 35 U.S.C. 154(b) by 433 days.

(21) Appl. No.: 12/796,083

(22) Filed: Jun. 8, 2010

(65) Prior Publication Data
US 2011/0298724 A1 Dec. 8, 2011

(51) Int. Cl.
*G06F 3/041* (2006.01)
(52) U.S. Cl.
USPC .......................................................... 345/173
(58) Field of Classification Search
USPC .......................................................... 345/173
See application file for complete search history.

(56) References Cited

U.S. PATENT DOCUMENTS

| | | |
|---|---|---|
| 2002/0015024 A1 | 2/2002 | Westerman et al. |
| 2006/0001650 A1 | 1/2006 | Robbins et al. |
| 2008/0036743 A1 | 2/2008 | Westerman et al. |
| 2009/0307589 A1 | 12/2009 | Inose et al. |
| 2010/0156804 A1* | 6/2010 | Young ............................ 345/173 |
| 2011/0032194 A1* | 2/2011 | Lai ................................. 345/173 |
| 2011/0041096 A1* | 2/2011 | Larco et al. .................... 715/835 |
| 2011/0234503 A1* | 9/2011 | Fitzmaurice et al. ......... 345/173 |
| 2011/0241988 A1* | 10/2011 | Bensler .......................... 345/158 |

FOREIGN PATENT DOCUMENTS

EP 2175354 A1 4/2010

OTHER PUBLICATIONS

Michael Ameling et al., "FraMuS—An Adaptive Framework for Multi-Touch Screens," Proceedings of the 2nd ACM SIGCHI Symposium on Engineering Interactive Computing Systems, EICS'10, Jun. 20, 2010, Berlin, Germany.
European Search Report for Application No. 11 003 375.0 dated Oct. 4, 2011, 7 pages.

\* cited by examiner

*Primary Examiner* — Long D Pham
(74) *Attorney, Agent, or Firm* — Fish & Richardson P.C.

(57) ABSTRACT

The present disclosure is directed to systems and methods determining a number of contact points applied to a touchscreen, executing, using one or more processors, an application function based on the number of contact points, determining that the number of contact points has decreased during execution of the application function, determining that the number of contact points is greater than zero, and continuing execution of the application function in response to determining that the number of contact points is greater than zero.

18 Claims, 6 Drawing Sheets

TOUCH SCREEN FOR BRIDGING MULTI AND/OR SINGLE TOUCH POINTS TO APPLICATIONS

BACKGROUND

Technological development has resulted in touch-screen computing devices that execute touch-based software applications becoming mainstream. With touch-screen devices, users experience a unique human-machine interaction. Such computing devices enable interaction that would be difficult or overly complex with conventional input devices, such as a mouse or keyboard. Although there are a variety of touch-screen devices available on the market, appropriate software is lacking or is device specific. Further, applications are specifically designed to enable touch-based input, making non-touch-based applications difficult to use on touch-screen devices.

SUMMARY

Implementations of the present disclosure provide computer-implemented methods including determining a number of contact points applied to a touch-screen, executing, using one or more processors, an application function based on the number of contact points, determining that the number of contact points has decreased during execution of the application function, determining that the number of contact points is greater than zero, and continuing execution of the application function in response to determining that the number of contact points is greater than zero.

In some implementations, methods further include determining that the number of contact points is equal to zero, and halting execution of the application function in response to determining that the number of contact points is zero.

In some implementations, methods further include determining that the number of contact points has increased during execution of the application function, determining an updated number of contact points in response to determining that the number of contact points has increased, identifying a subsequent application function corresponding to the updated number of contact points, halting execution of the application function in response to determining that the number of contact points has increased, and executing the subsequent application function. Methods can further include determining that the number of contact points has decreased during execution of the subsequent application function, determining that the number of contact points is greater than zero, and continuing execution of the subsequent application function in response to determining that the number of contact points is greater than zero.

In some implementations, determining that the number of contact points has decreased includes generating a current frame corresponding to the touch-screen, retrieving a previous frame corresponding to the touch-screen from a computer-readable storage device, and comparing the current frame to the previous frame to determine a change in the number of contact points.

In some implementations, the contact points correspond to a gesture of a user and the application function is determined based on the gesture.

In some implementations, each contact point is provided as a binary large object (BLOB) and includes an associated identification and x-y coordinates relative to the touch-screen.

Implementations of the present disclosure provide computer-implemented methods including detecting user input to a touch-screen, identifying one or more contact points of the user input, interpreting the one or more contact points as a gesture, mapping the gesture to a function executed by an application, executing the function in response to the user input.

In some implementations, mapping includes accessing a table that is specific to the application.

In some implementations, the one or more contact points are interpreted based on a number of the contact points and respective movements of the contact points.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes a touch-screen display, one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to bridging human interaction devices with multi-touch capabilities and screens. Specifically, dynamic command features are provided for any applications in all domains. Consequently, users are able to apply multi-touch features for any application. Further, implementations of the present disclosure enable the integration of multi-touch devices on the fly or to easily exchange recognition patterns. In general, touch-screen contact events, from any type of touch-screen device, are interpreted as gestures and the gestures are mapped to application specific implementations of the respective functions represented by the gestures. This enables an environment that provides switching between multi-point and single-point devices without the need of changing the implementation. Furthermore, non-touch-based applications can be multi-touch enabled or vice versa, where multi-touch applications can be used by single-point devices. The bi-directional connection between multi-/single-point devices and applications enables enhancement of existing environments or applications, and also simplifies the development and testing of multi-touch environments or applications. Implementations of the present disclosure are further directed to an automation model for handling gestures when a number of contact points increases or decreases during execution of a particular gesture.

Figure 1:
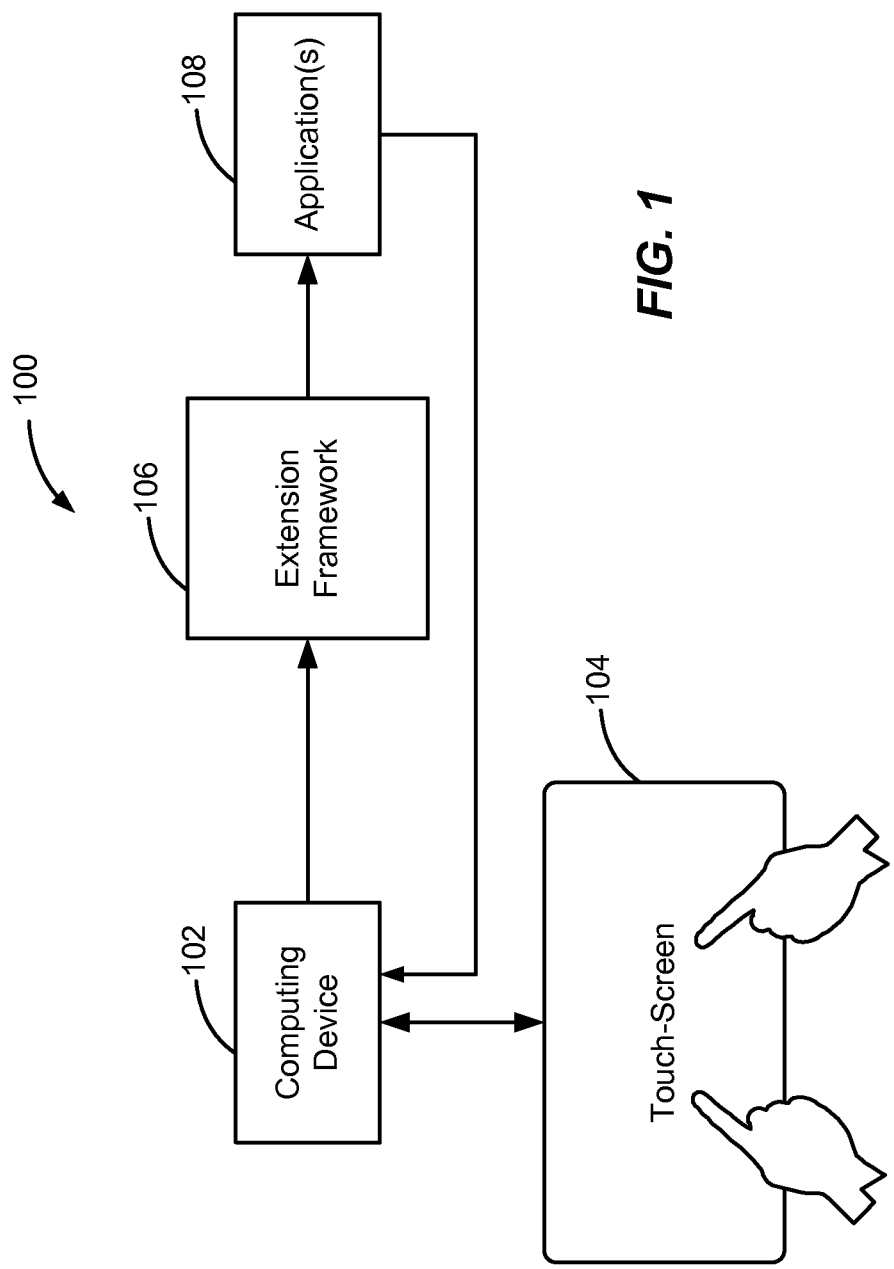
FIG. 1 is a schematic illustration of a system in accordance with implementations of the present disclosure.

Referring now to FIG. 1, an example system 100 includes a computing module 102, a touch-screen 104, an extensible framework 106 and one or more applications 108. The example system 100 can be implemented in a single computing device, or can be distributed across multiple computing devices that communicate over a network.

In the case of a single computing device, the system 100 can include a computer system, a personal digital assistant (PDA), a smartphone or the like. The system 100 can include one or more processors and computer-readable memory. For example, the touch-screen 104 can be a component of or can be in communication with the single computing device, and can receive user input in the form of user contact with the touch-screen. The user input can be provided to the computing module 102, which processes the user input and provides input to the extensible framework 106. The extensible framework 106 interprets the user input as one or more gestures, and maps the one or more gestures to a function that is to be executed by the one or more applications 108. The one or more applications 108 execute the indicated one or more functions and provides output to the computing module 102. The computing module 102 can process the output and can provide output to the touch-screen. For example, the computing module 102 can provide output to the touch-screen such that a display of the touch-screen changes based on the output of the one or more applications.

In the case of multiple computing devices that communicate over a network, an example system architecture can include the computing module 102 being a component of a first computing device, the touch-screen 104 being a component of a second computing device, and the extensible framework 106 and the one or more applications being executed on a third computing device. The first computing device can include a client device, for example, and the third computing device can include a server device, which communicate over a network. In some implementations, the touch-screen and the computing module can be integrated into a single computing device, such as a smartphone, for example.

As discussed in further detail below, the extensible framework of the present disclosure bridges multi-touch devices and applications. Specifically, the extensible framework enables any application to be executed based on user input to any multi-touch device. In this manner, an application does not have to be specifically designed for touch-based input and does not have to be device specific. Furthermore, the extensible framework of the present disclosure enables translation of the recognized gestures to accommodate individual and domain specific needs. For example, a particular gesture can be used to induce execution of one function of an application, and the same gesture can be used to induce execution of another, different function of another, different application.

The extensible framework of the present disclosure provides an extensible mapping between human gestures and traditional, non-touch-screen input devices (e.g., mouse, keyboard). The extensible framework provides a multi-touch approach where several events are triggered simultaneously to execute a particular action. A multi-point approach enables several events to be triggered to simultaneously execute independent actions, which results in special requirements for using applications. To distinguish between multi-touch and multi-point, it is assumed that the extensible framework triggers single input device events (e.g., a single mouse event, or a single keyboard event). With a multi-point approach, it is possible to trigger multiple events simultaneously, which enables multiple users to collaborate using a single touch-screen.

Figure 2:
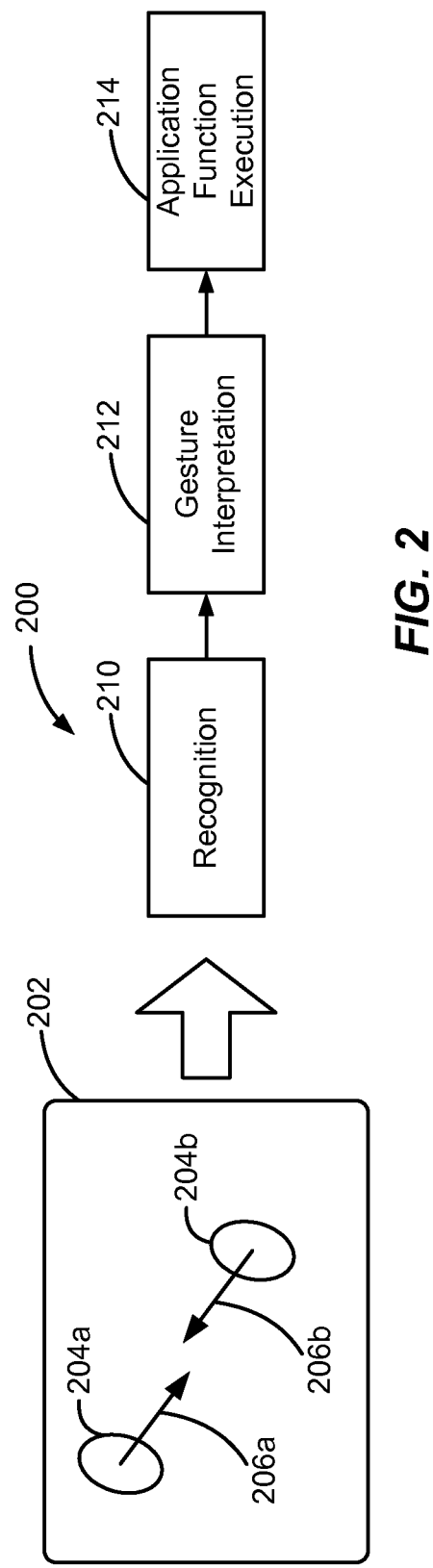
FIG. 2 is a block diagram illustrating a general process of the present disclosure.

Referring now to FIG. 2, a general process 200 will be discussed. A user interacts with a touch-screen 202 by providing one or more contact points 204a, 204b. The contact points 204a, 204b can be generated based on finger contact (e.g., finger tips) with the touch-screen 202, and are recognized as binary large objects (BLOBs). The user interaction comprises a gesture that can include movement of the contact points 204a, 204b. In the exemplar illustration of FIG. 2, the movement includes movement of the contact points 204a, 204b towards each other in directions 206a, 206b, respectively. In some instances, the movement can include removal of the contact point from the touch-screen. For example, the user may select a dialog box or click a button displayed on the touch-screen using a quick finger-tap on the touch-screen. In such cases, a single contact point may be provided and may only be present on the touch-screen for a short time.

The general process 200 includes recognition 210, gesture interpretation 212 and application function execution 214. Recognition 210 includes a process for detecting contact points and contact point size and movement on, to or from the touch-screen. Specifically, the recognition process maps each contact point and its shape to a certain position on the touch-screen. Recognition patterns can vary in complexity and accuracy, and the number of possibly recognized contact points can differ. For example, devices that allow only the recognition of a single contact point are called single-touch devices, and devices that allow simultaneous recognition of multiple contact points are called multi-touch devices. Recognition 210 includes the triggering of contact points moved successively or simultaneously. In FIG. 2, the exemplar movement of two fingers simultaneously is depicted, which is indicated by two recognized contact points changing their position at the same time.

Gesture interpretation 212 includes a process for determining a particular gesture indicated based on the number of contact points and the relative movement thereof. In FIG. 2, an exemplar gesture can include a gesture for zooming in. That is, the simultaneous movement of the contact points 204a, 204b towards each other can indicate that a user desires to zoom a view depicted on the touch-screen 202. The interpreted gesture is related to a function that is executed by the subject software application. Accordingly, application function execution 214 includes the execution of the function indicated by the gesture. For example, and in the scenario depicted in FIG. 2, a desktop displayed on the touch-screen can be enlarged, a view can be zoomed in a mapping application, or a font size can be enlarged in a specific web-browser application.

In general a gesture is a common notion and abstraction dealing with multi-touch environments. Gestures are used to describe actions that are performed to a multi-touch touch-screen. Exemplar actions can include clicking on a button, zooming a window and/or rotating an object. A defined set of common actions mapped to gestures can be provided, and new gesture-to-action mappings can be added. For each gesture, an individual algorithm is provided that interprets the recognized contact points.

Figure 3:
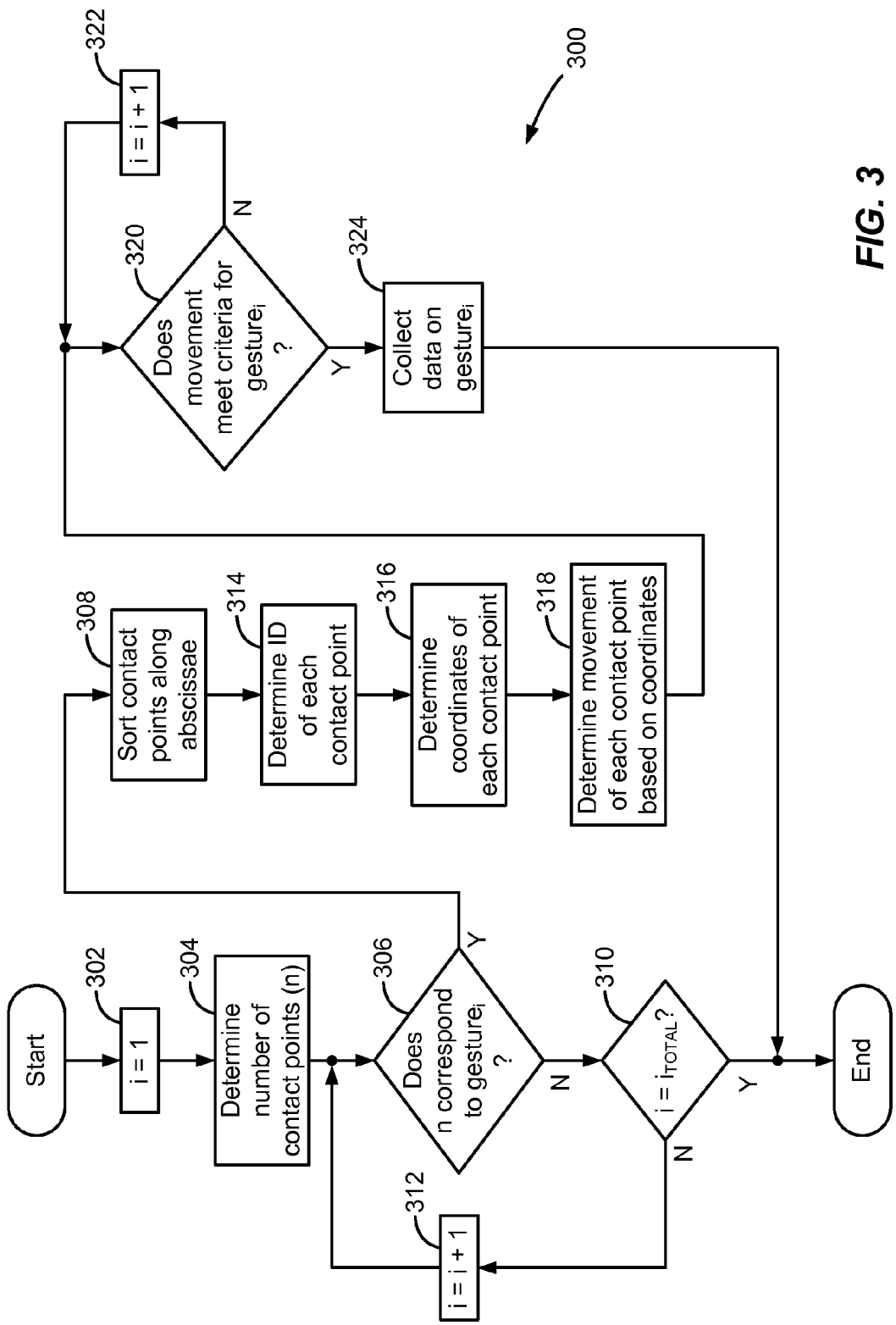
FIG. 3 is a flowchart illustrating example steps that can be executed to interpret a gesture.

With particular reference to FIG. 3, example steps that can be executed to interpret the recognized contact points will be discussed. In step 302, a counter (i) is set equal to 1. In step 304, the number of contact points (n) is determined. For example, the extensible framework 106 can determine the number of contact points (n) based on input from the computing module 102. For example, the computing module 102 can determine the number of contact points (n) based on a frame generated based on output provided by the touch-screen 104, and can provide the number of contact points (n) to the extensible framework 106. In step 306, it is determined whether the number of contact points (n) corresponds to a particular gesture$_i$. For example, the extensible framework 106 can compare the number of contact points (n) to a stored number of contact points (n) corresponding to gesture$_i$. If the number of contact points (n) corresponds to gesture$_i$, the process continues in step 308. If the number of contact points (n) does not correspond to gesture$_i$, the process continues in step 310.

In step 310, it is determined whether the counter i is equal to a total counter value ($i_{TOTAL}$). If the counter i is equal to $i_{TOTAL}$, all of the gestures (e.g., gesture$_1$ to gesture$_{iTOTAL}$) known to the extensible framework have been considered and the process ends without recognition of a particular gesture. If the counter i is not equal to $i_{TOTAL}$, the counter i is incremented by one in step 312, and the process loops back to step 306. In this manner, the next gesture of the gestures known to the extensible framework is considered with respect to the number of contact points (n).

In step 308, the contact points are sorted along abscissae. For example, the touch-screen can include a multi-dimensional plane defined by x and y abscissae. Information regarding the contact points relative to the abscissae can be provided to the extensible framework 106 from the computing module 104, for example. In step 314, an ID of each of the contact points is determined. For example, the extensible framework 106 can determine the ID of each contact point based on the BLOB data corresponding to each contact point. The x-y coordinates of each contact point are determined in step 316. For example, the computing module 102 and/or the extensible framework 106 can determine the current x-y coordinates for each contact point based on a current frame. In step 318, a movement of each of the contact points is determined based on the x-y coordinates. For example, the computing module 102 and/or the extensible framework 106 can compare x-y coordinates determined from the current frame to x-y coordinates determined from a previous frame to determine movement of each of the contact points.

In step 318, it is determined whether movement of the contact points corresponds to criteria for the particular gesture$_i$. Example criteria can include, but is not limited to, a threshold distance and/or a direction of each contact point relative to one another (e.g., toward each other, away from each other, parallel to one another). If the movement of the contact points does not meet the criteria, the counter (i) is incremented by one in step 322 and the process loops back to step 320 to evaluate the movement for the next gesture. If the movement of the contact points meets the criteria, data corresponding to gesture$_i$ is collected in step 324, and the process ends. The data includes collected information about the position of the contact points.

An execution action is correlated with each gesture. The execution action describes what function an application executes in response to a gesture. Consequently, a gesture can be divided into a syntax component and a semantic component. The syntax component is described through a recognition algorithm. The semantic component is described through sequential steps of user input (e.g., mouse and/or keyboard events). The intended semantic can be executed differently in each application domain. Consequently, the extensible framework (e.g., extensible framework 106 of FIG. 1) describes how each gesture is executed individually. In some cases an extension or exchange of the gesture syntax may be appropriate.

Adaptive device integration enables switching between different devices on demand. Devices can include touch-screens with different functionalities and sizes or a variety of input devices such as tablets. As discussed above, the example of FIG. 2 recognizes a zoom gesture from a multi-touch touch-screen, which is recognized when the contact points are simultaneously moved. This gesture can correspond to an event of another input device, such as a mouse event, for example. Such a mouse event can include rotating a mouse wheel. In Table 1 below, example standard gestures are provided. By extending the appropriate interface, additional gestures can be defined.

TABLE 1

| GESTURE | RECOGNITION | EXAMPLE ACTION |
| --- | --- | --- |
| press | 1 BLOB w/new, unknown ID | pressing a button by finger tip |
| pan | 1 BLOB w/known ID | moving an object |
| rotate | 2 BLOBs: 1. BLOB w/o movement; 2. BLOB w/movement | rotating an object |
| scroll | 2 BLOBs moved along the ordinate | scrolling pages/windows |
| zoom in | 2 BLOBs w/divergent movement along the abscissa | enlarging view/object |
| zoom out | 2 BLOBs w/convergent movement along the abscissa | shrinking view/object |
| right click | consecutive: 1. BLOB; 2. BLOB directly besides the first blob | executing right click |
| navigate forward | 1 BLOB with fast left movement | navigating to next object/view |
| navigate backward | 1 BLOB with fast right movement | navigating to previous object/view |
| move window | moving 3 BLOBs | moving a certain window |
| resize window | equal to zoomIn/zoomOut with 2 fingers per hand | translating of a window |

The recognition of the multi-touch can be exchanged. That is, the user input is not based on a fixed implementation. For each gesture, an individual recognition implementation can be used whereas the framework delivers a default implementation. As discussed above, the extensible framework uses contact points provided as BLOBs as the input format. In the simplest occurrence, a contact point comprises an identification (ID), and x-coordinate and a y-coordinate. A size of the contact point can also be provided. Each contact point also includes a timestamp indicating the time, at which the particular contact point was recognized. The ID represents a particular contact point, and the ID is not reassigned until the particular contact point is lost (e.g., a particular finger is removed from contact with the touch-screen). Consequently, a finger, for example, is recognized during translation until it is released.

Figure 4C:
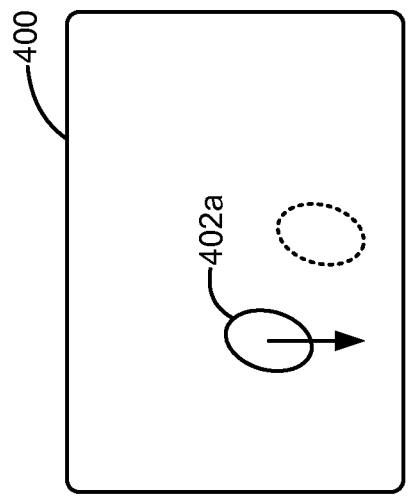
FIGS. 4A-4C include block diagrams illustrating exemplar frames of a touch-screen.
Figure 4B:
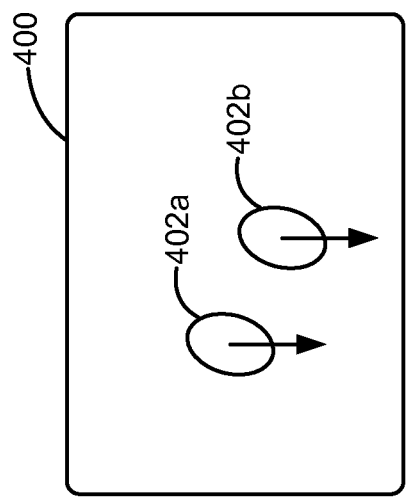
Figure 4A:
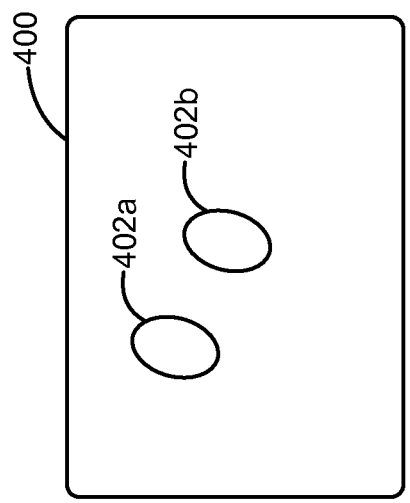

Referring now to FIGS. 4A-4C, contact points are transferred within a frame. A frame is a snap-shot of the touch-screen at a given time. A frame can be compared to a subsequent frame to determine a change in the touch-screen input. FIG. 4A illustrates a first frame of a touch-screen 400 indicating two contact points 402a, 402b, respectively. The first frame of FIG. 4A can correspond to an instant when the contact points 402a, 402b are first generated on the touch-screen. Subsequent to this recognition, each contact point can have an ID assigned thereto, and current x-y coordinates associated therewith. FIG. 4B illustrates a second frame of the touch-screen 400 at some time subsequent to the first frame of FIG. 4A. The second frame of FIG. 4B indicates simultaneous movement of the contact points 402a, 402b. The movement of each contact point 402a, 402b can be determined by comparing the current frame to a subsequent frame. Specifically, the x-y coordinates of the contact point 402a of the frame of FIG. 4B can be compared to the x-y coordinates of the same contact point 402a of frame FIG. 4A, using the contact point ID to ensure that the x-y coordinates of contact point 402a are not compared to the x-y coordinates of contact point 402b. The change in the x-y coordinates indicates the movement, and a rate of change can be determined based on a time difference between frames. FIG. 4C illustrates a third frame of the touch-screen 400 at some time subsequent to the second frame of FIG. 4B. The third frame of FIG. 4C indicates continued movement of contact point 402a and a release of contact point 402b.

Each frame transferred from a touch-screen to the extensible framework (e.g., through a computing module) can include an array of contact points recognized at the same time. The array of contact points enables interpretation of different multi-touch gestures. Gesture interpretation can be based on movement of the contact points that is determined by comparing a current frame, for example, to one or more buffered, or previous frames. In some implementations, default actions can be provided, such as those provided in Table 1 above.

An application-dependent execution of gestures is not mandatory. Nevertheless, a customized execution can be implemented for each application. For example, it is possible to determine that the zoom-in gesture is executed in a web-browser application by pressing the keys CTRL+PLUS, and in a mapping application by rotating mouse scroll wheel, respectively. Accordingly, a recognized zoom-in gesture would result in an equivalent CTRL+PLUS input to the web-browser application, and would result in a mouse scroll wheel input to the mapping application. For any other purpose the extensible framework includes a default implementation for executions. Common executions for recent operating systems can be used. A default implementation uses simplified (e.g., the java mouse implementation (robot)) keyboard short cuts or native windows operations (i.e., winOperations). A selection of an example default mapping is provided in Table 2, where Java notation is used for execution description.

TABLE 2

| GESTURE | EXECUTION |
|---|---|
| press | robot.pressMouse( ) |
| pan | robot.moveMouse( ) |
| rotate | N/A |
| scroll | robot.mouseWheel(amount) |
| zoom in | N/A |
| zoom out | N/A |
| right click | robot.rightclick( ) |
| navigate forward | robot.pressKey(RIGHT) |

TABLE 2-continued

| GESTURE | EXECUTION |
|---|---|
| navigate backward | robot.pressKey(LEFT) |
| move window | winOperations.moveWin( ) |
| resize window | winOperations.resizeWin( ) |

Actions that are application specific are not assigned in the default implementation. Consequently, the execution of such actions is implemented as application dependent, using a standard interface. In the default implementation no application specific mapping is provided. Common gestures (e.g., navigating, scrolling) are used on multiple platforms in the same manner. Consequently, a generic execution of application functions is provided, if an application is un-specified to the extension framework. On the other hand, gestures (e.g., zooming) are not provided in the default implementation, because the execution semantics are different as between specific applications. Application specific execution of functions can be implemented additionally, in a non-default implementation.

The extensible framework of the present disclosure enables the integration of any touch-screen devices with any operating system, regardless of the particular computing device on which the operating system is executed (e.g., personal computer, laptop, PDA, smartphone, mobile device). The extensible framework also enables user interaction through any single-point or multi-point input devices. Consequently, a user input device (e.g., a mouse, a keyboard, a multi-touch screen or multi-touch display) is able to be attached in a single computing environment. Standard application interfaces are provided for device input (e.g., for receiving tangible user interface object (TUIO) messages or BLOB arrays using multi-touch devices). Furthermore, the extensible framework can be used on any operating system using a virtual machine (VM), such as a Java Virtual Machine (JVM).

The extensible framework can also be integrated using proprietary application program interfaces (APIs), such as the Microsoft Windows Touch API. Consequently, proprietary multi-touch devices can be integrated as well. The same applies to other platforms. In particular, the touch-screen communicates with the computing module through an API, which is provided by the particular operating system. The extensible framework registers at the API for touch events. The extensible framework receives touch events asynchronously from the API. Generally, the API functions as a proxy for touch-screen device integration.

The extensible framework of the present disclosure also provides a registration for events. Events can be provided by single-touch and multi-touch devices. Consequently, a normal Java application, for example, can register for rough touch events. This helps to implement real multi-point applications in Java or applications with the need for multi-touch where a mapping does not fit the needs.

In some implementations, the extensible framework can include several packages that provide predefinitions of execution for different applications, extensible classes for gesture recognition, listener interfaces for an event integration, interfaces for device and platform integration, and representation of touch information coming from a touch-screen in Java. Generally, a package subsumes classes that belong together semantically (e.g., a package for recognition, a package for device integration, a package for application execution). Using the extensible framework, the modality of gesture recognition can be exchanged. Consequently, the interface IAppRecognition is implemented. The class DefaultImplementation can be used for default implementation, and includes a pre-defined selection of gesture recognitions. An interface code example includes:

```
public abstract class IAppRecognition {
    static Map<Integer, BlobJ> lastBlobs =
        new HashMap<Integer, BlobJ>( );
    public abstract boolean press(
        GestureInfo gi);
    public abstract Boolean pan(
        GestureInfo gi);
    public abstract Boolean zoomIn(
        GestureInfo gi);
    public abstract Boolean zoomOut(
        GestureInfo gi);
    public abstract Boolean rotate(
        GestureInfo gi);
    public abstract Boolean clickRight(
        GestureInfo gi);
    public abstract Boolean scroll(
        GestureInfo gi);
    public abstract Boolean navigateForward(
        GestureInfo gi);
    public abstract Boolean navigateBackward(
        GestureInfo gi);
    public abstract Boolean resizeWindow(
        GestureInfo gi);
    public abstract Boolean moveWindow(
        GestureInfo gi);
}
```

The data type GestureInfo is used to store the necessary data for subsequent execution. After implementing the new class, it is registered at the MotionListener according to the following example code:

```
public static void main(String[ ] args) {
    MotionInterpreter mi = new
        MotionInterpreter( );
    mi.setRecognition(new MyRecognition( ));
    mi.start( );
}
```

The specific implementation of commands for application-dependent execution uses the interface IAppImplementation in the related class. The re-implementation of all gestures can be avoided by inheriting from the default implementation (DefaultImplementation). Consequently, common gesture executions such as clicking can be inherited or overwritten. Within the most methods, it is possible to control a native robot to execute mouse or keyboard events. In this manner, a desired operation can be controlled. An interface code example includes:

```
public abstract class IAppImplementation {
    public abstract void press(
        GestureInfo gi);
    public abstract void pan(
        GestureInfo gi);
    public abstract void zoomIn(
        GestureInfo gi);
    public abstract void zoomOut(
        GestureInfo gi);
    public abstract void rotate(
        GestureInfo gi);
    public abstract void clickRight(
        GestureInfo gi);
    public abstract void scroll(
        GestureInfo gi);
    public abstract void navigateForward(
        GestureInfo gi);
    public abstract void navigateBackward(
        GestureInfo gi);
    public abstract void resizeWindow(
        GestureInfo gi);
    public abstract void moveWindow(
        GestureInfo gi);
}
```

Within the data type GestureInfo, the complete gesture related information is stored (e.g., the gesture relevant pointer coordinates). Moreover, the data type GestureInfo contains the mouse and keyboard control to issue particular actions in the execution phase.

To use the new implementation, an instance of the class is registered at the MotionInterpreter to receive gesture notifications. The register( ) method takes a string as an assigner to subsequently identify the application. To this point, identification is achieved using the title of the application. Example code for selected applications includes:

```
public static void main(String[ ] args) {
    MotionInterpreter mi = new
        MotionInterpreter( );
    mi.register("Firefox", new
        FirefoxInterpreter( ));
    mi.register("Picture_and_Fax_Viewer", new
        WindowsPictureAndFaxViewerInterpreter
        ( ));
    mi.register("Google_Earth", new
        GoogleEarthInterpreter( ));
    mi.start( );
}
```

To integrate a device or particular platform the following interface can be implemented:

```
public interface IScreenAdapter {
    public BlobsOfNextFrameJ
        getBlobsOfNextFrame( );
    public boolean hasMoreElements( );
}
```

The method getBlobsOfNextFrame( ) is called by the extensible framework to retrieve the BLOBs for the next frame. The object of the type BlobsOfNextFrameJ can be a simple data structure that includes an array of BLOBs and a timestamp (e.g., in milliseconds). As an example, this makes it possible to provide a native implementation to an operating system API to integrate multiple multi-touch devices.

A newly implemented device can be used in the initialization phase of the framework in accordance with the following example code:

```
public static void main(String[ ] args) {
    IScreenAdapter adapter = new
        MyScreenAdapter( );
    MotionInterpreter mi = new
        MotionInterpreter(adapter);
    //...
    mi.start( );
}
```

Now the new device or platform can be used with the extensible framework in a very simple manner.

To receive rough touch data, applications can register for such events. A common event listener mechanism can be used:

```
public interface MultitouchListener {
    public abstract void touchEven(BlobJ[ ]
        blobs);
    public abstract void gesture(GestureInfo
        gi);
}
```

An implementation can receive two types of events, for example. The method touchEvent( ) delivers the rough data in the data structure of the recognized BLOB that is used within the whole framework. If a gesture is recognized, the gesture method is called providing the data type GestureInfo, which contains all necessary information about the gesture. The usage can then be applied:

```
public static void main(String[ ] args) {
    MultitouchListener listener = new
        MyMultitouchListener( );
    MotionInterpreter mi = new
        MotionInterpreter( );
    mi.addMultitouchListener(listener);
    //...
    mi.start( );
}
```

It is appreciated that the use of multi-touch devices leads to restrictions. For example, the use of multiple fingers can be restrictive in that the use of multiple fingers/contact points can lead to technical problems. Specifically, when using a multi-touch device, the recognition is not fully accurate and fingers are sometimes not recognized. For example, two fingers may be used for zooming a displayed view by sliding the fingers on a touch-screen towards each other. During the sliding movement, one of the contact points associated with the two fingers may be lost during recognition. Consequently, the desired gesture is not interpreted and the desired application function is not executed properly. This can lead to problems, because another gesture may be interpreted and an undesired application function executed. In short, gestures requiring a certain number of contact points can be easily triggered by a gesture using a different number of contact points when the recognition fails.

To avoid this effect, the extensible framework includes an automation model, or automaton. The automaton provides that, once a gesture using multiple fingers is recognized, a gesture using less fingers cannot be triggered until all fingers are released. The automaton further provides that, once a gesture using multiple fingers is recognized, a gesture using more fingers can be recognized, but then the rule above applies again. Further, and in some cases, there may be gestures that use the same number of fingers. These particular subsets of gestures are provided with an implicit order of recognition that is not changed. For example, zooming and scrolling functions can be triggered using two contact points. Consequently, the recognition and gesture interpretation is based on as between the two-contact point gestures is based on movement using an implicit interpretation order. An example interpretation order can include determining whether the gesture is a scroll gesture, if the gesture is not a scroll gesture, determining whether the gesture is a zoom gesture, and, if not a zoom gesture, do nothing.

The automaton starts after the first recognition and jumps to multiple finger gestures with respect to the amount of recognized fingers (i.e., contact points provided as BLOBs). The recognition leads to a gesture interpretation and execution of an application function, as discussed above. Once more fingers are recognized, a new execution of a different gesture is provided. During execution, if less fingers are recognized, the change is ignored, and the execution still applies for the same gesture as before. Only when no fingers are recognized anymore, does the execution finish and the automaton starts from the beginning.

Figure 5:
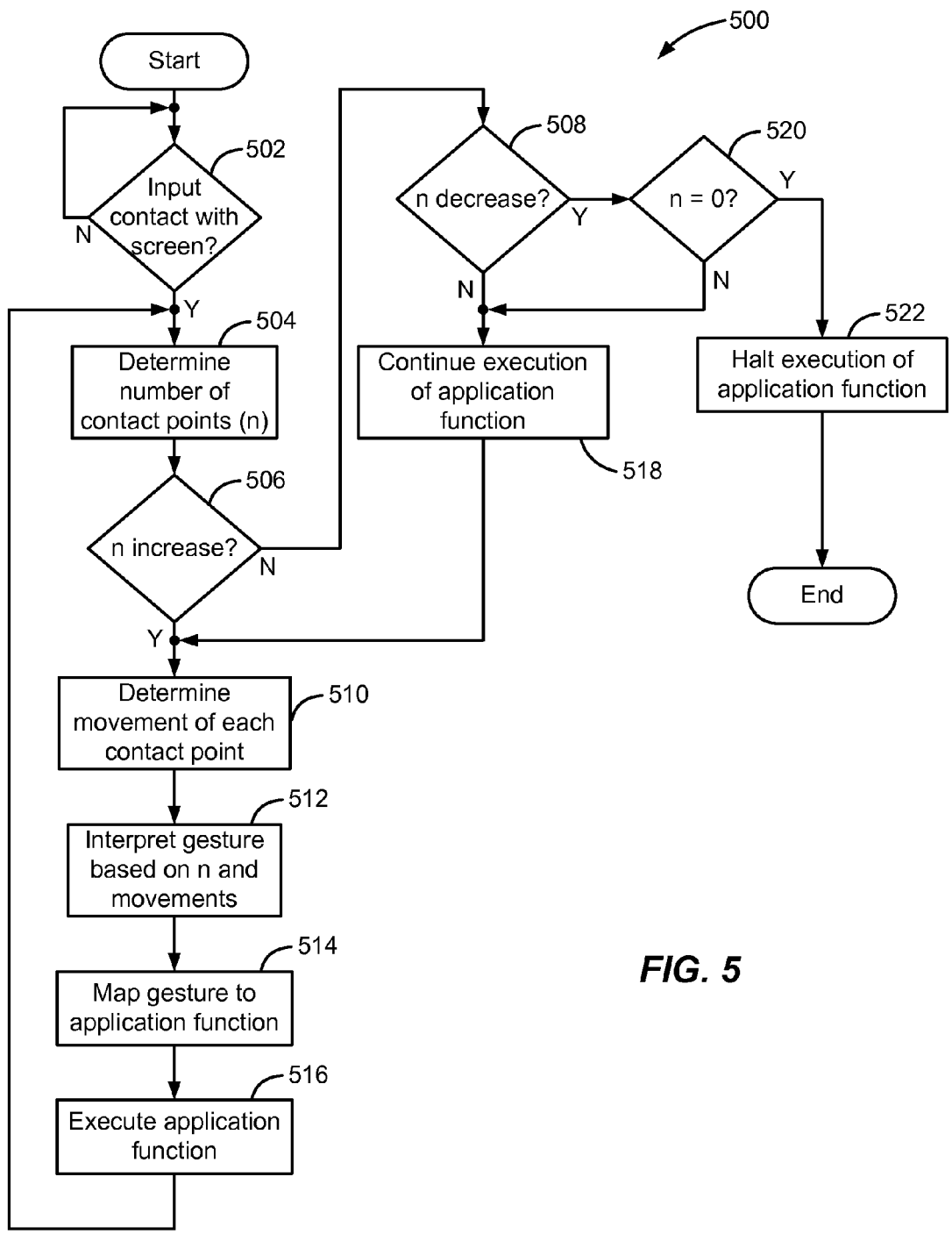
FIG. 5 is a flowchart illustrating example steps that can be executed in implementations of the present disclosure.

Referring now to FIG. 5, an example process 500 is illustrated. In step 502, it is determined whether input contact with a touch-screen exists. For example, the computing module 102 of FIG. 1 can recognize that input contact with the touch-screen 104 exists based on output provided by the touch-screen 104. If no input contact with the touch-screen is recognized, the steps loop back. If input contact with the touch-screen is recognized, the number of contact points, or BLOBs, (n) is determined in step 504. For example, the computing module 102 can determine the number of contact points (n) based on a frame generated based on output provided by the touch-screen 104. In step 506 it is determined whether the number of contact points (n) has increased. For example, the computing module 102 can recognize one or more additional contact points based on output provided by the touch-screen 104. This can be achieved, for example, by comparing a current frame to one or more previous frames stored in digital memory. If the number of contact points (n) has not increased, the steps continue in step 508. If the number of contact points (n) has increased, the process continues in step 510.

In step 510, a movement of each contact point is determined. For example, the computing module 102 can determine movement of each of the contact points based on frames generated based on output provided by the touch-screen 104, as discussed above. In step 512, a gesture is interpreted based on the number of contact points (n) and the movement of each contact point. For example, the extensible framework 106 of FIG. 1 can interpret the gesture based on output provided by the computing module 104. The gesture is mapped to an application function in step 514. For example, the extensible framework 106 can map the gesture to a function that is specific to a particular application. In step 516, the application function is executed. For example, the extensible framework 106 can provide output to one or more applications 108, which execute a function corresponding to the output.

In step 508, it is determined whether the number of contact points (n) has decreased. For example, the computing module 102 can recognize the removal of one or more contact points based on output provided by the touch-screen 104. This can be achieved, for example, by comparing a current frame to one or more previous frames stored in digital memory. If the number of contact points (n) has not decreased, execution of the application function continues in step 518, and the process loops back to step 510. If the number of contact points (n) has decreased, it is determined whether the number of contact points (n) is equal to zero in step 520. If the number of contact points (n) is not equal to zero, the process loops to step 518, discussed above. If the number of contact points (n) is equal to zero, execution of the application function is halted in step 522, and the process ends.

The extensible framework of the present disclosure bridges the gap between single-/multi-touch devices and single-/multi-touch applications, and enables users to use any single-touch application with multi-touch devices, as well as any single-touch device with multi-touch applications. The extensible framework enables easy integration and mapping of application functions to gestures. Further, the present disclosure provides an automation model, or automaton for multi-touch devices to improve the accuracy of gesture recognition and application function execution. The extensible framework enables applications to react to multi-touch input without re-implementing gesture events, and can be used independently on multiple platforms.

Figure 6:
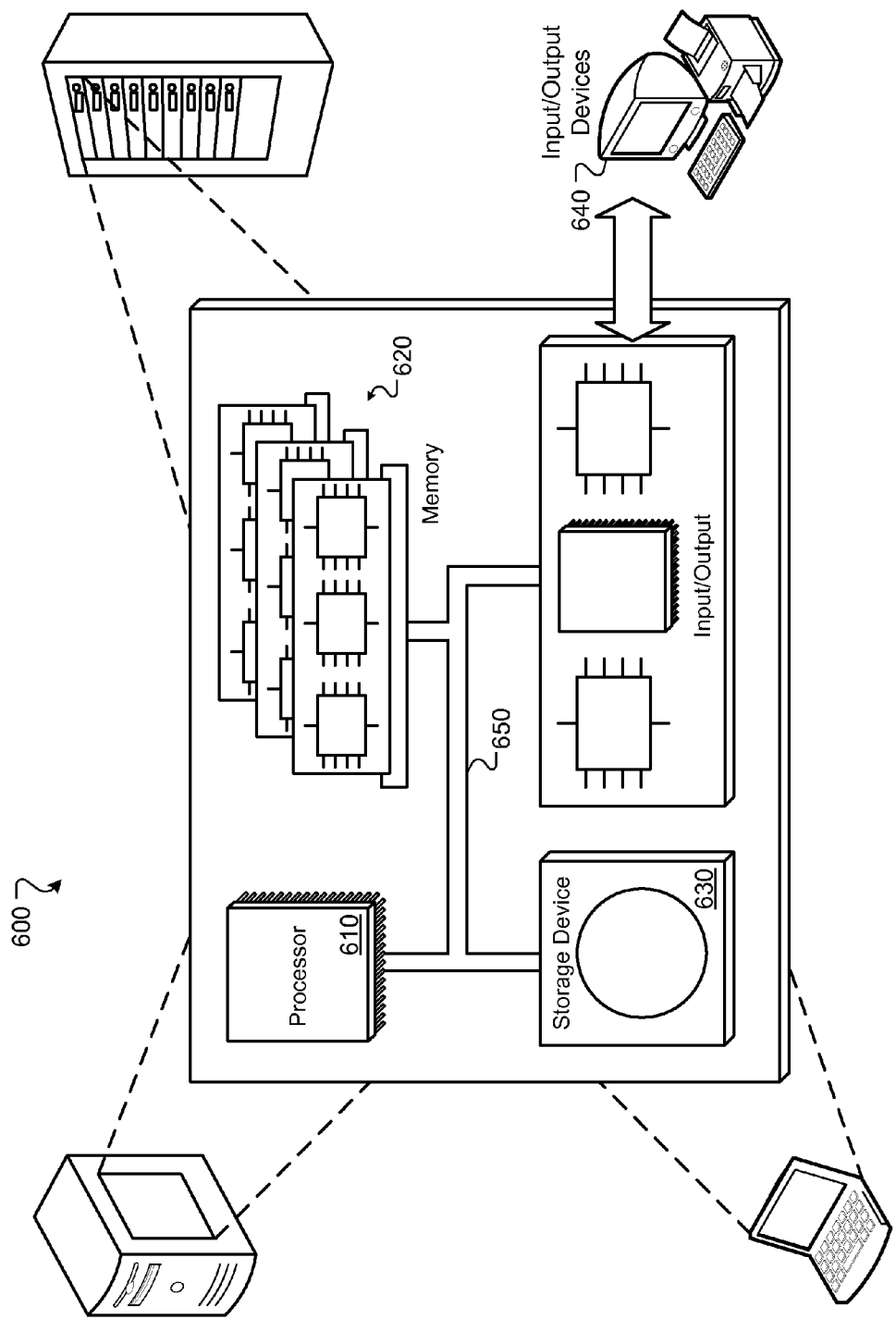
FIG. 6 is a schematic illustration of example computer systems that can be used to execute implementations of the present disclosure.

Referring now to FIG. 6, a schematic diagram of an exemplar computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method, comprising:
   determining that contact points are applied to a touch-screen, and in response:
      determining a gesture of a user based on a number of contact points applied to the touch-screen, a movement of each of the contact points, and an interpretation order, the interpretation order comprising a plurality of gestures, the gesture being included in the plurality of gestures;
      determining an application function to be executed based on the gesture; and
      executing, using one or more processors, the application function;
   determining that the number of contact points has decreased during execution of the application function, and in response:

determining that the number of contact points is greater than zero and that movement of remaining contact points corresponds to the gesture; and continuing execution of the application function in response to determining that the number of contact points is greater than zero.

2. The method of claim 1, further comprising:

determining that the number of contact points is equal to zero; and halting execution of the application function in response to determining that the number of contact points is zero.

3. The method of claim 1, further comprising:

determining that the number of contact points has increased during execution of the application function;

determining an updated number of contact points in response to determining that the number of contact points has increased;

identifying a subsequent application function corresponding to the updated number of contact points;

halting execution of the application function in response to determining that the number of contact points has increased; and executing the subsequent application function.

4. The method of claim 3, further comprising:

determining that the number of contact points has decreased during execution of the subsequent application function;

determining that the number of contact points is greater than zero; and continuing execution of the subsequent application function in response to determining that the number of contact points is greater than zero.

5. The method of claim 1, wherein determining that that the number of contact points has decreased comprises:

generating a current frame corresponding to the touch-screen;

retrieving a previous frame corresponding to the touch-screen from a computer-readable storage device; and comparing the current frame to the previous frame to determine a change in the number of contact points.

6. The method of claim 1, wherein each contact point is provided as a binary large object (BLOB) and includes an associated identification and x-y coordinates relative to the touch-screen.

7. The method of claim 1, the gesture comprising a syntax component and a semantic component.

8. A computer-readable storage device coupled to one or more processors having instructions stored thereon which, when executed by the one or more processors, cause the one or more processors to perform operations comprising:

determining that contact points are applied to a touch-screen, and in response:

determining a gesture of a user based on a number of contact points applied to the touch-screen, a movement of each of the contact points, and an interpretation order, the interpretation order comprising a plurality of gestures, the gesture being comprised in the plurality of gestures;

determining an application function to be executed based on the gesture; and executing, using one or more processors, the application function;

determining that the number of contact points has decreased during execution of the application function, and in response:

determining that the number of contact points is greater than zero and that movement of remaining contact points corresponds to the gesture; and continuing execution of the application function in response to determining that the number of contact points is greater than zero.

9. The computer-readable storage device of claim 8, wherein the operations further comprise:

determining that the number of contact points is equal to zero; and halting execution of the application function in response to determining that the number of contact points is zero.

10. The computer-readable storage device of claim 8, wherein the operations further comprise:

determining that the number of contact points has increased during execution of the application function;

determining an updated number of contact points in response to determining that the number of contact points has increased;

identifying a subsequent application function corresponding to the updated number of contact points;

halting execution of the application function in response to determining that the number of contact points has increased; and executing the subsequent application function.

11. The computer-readable storage device of claim 10, wherein the operations further comprise:

determining that the number of contact points has decreased during execution of the subsequent application function;

determining that the number of contact points is greater than zero; and continuing execution of the subsequent application function in response to determining that the number of contact points is greater than zero.

12. The computer-readable storage device of claim 8, wherein determining that that the number of contact points has decreased comprises:

generating a current frame corresponding to the touch-screen;

retrieving a previous frame corresponding to the touch-screen from a computer-readable storage device; and comparing the current frame to the previous frame to determine a change in the number of contact points.

13. The computer-readable storage device of claim 8, wherein each contact point is provided as a binary large object (BLOB) and includes an associated identification and x-y coordinates relative to the touch-screen.

14. A system, comprising:

a touch-screen display;

one or more processors that receive input from and provide output to the touch-screen display; and a computer-readable storage device coupled to the one or more processors having instructions stored thereon which, when executed by the one or more processors, cause the one or more processors to perform operations comprising:

determining that contact points are applied to a touch-screen, and in response:

determining a gesture of a user based on a number of contact points applied to the touch-screen, a movement of each of the contact points, and an interpretation order, the interpretation order comprising a plurality of gestures, the gesture being comprised in the plurality of gestures;

determining an application function to be executed based on the gesture; and executing, using one or more processors, the application function;

determining that the number of contact points has decreased during execution of the application function, and in response:

determining that the number of contact points is greater than zero and that movement of remaining contact points corresponds to the gesture; and continuing execution of the application function in response to determining that the number of contact points is greater than zero.

15. The system of claim 14, wherein the operations further comprise:

determining that the number of contact points is equal to zero; and halting execution of the application function in response to determining that the number of contact points is zero.

16. The system of claim 14, wherein the operations further comprise:

determining that the number of contact points has increased during execution of the application function;

determining an updated number of contact points in response to determining that the number of contact points has increased;

identifying a subsequent application function corresponding to the updated number of contact points;

halting execution of the application function in response to determining that the number of contact points has increased; and executing the subsequent application function.

17. The system of claim 16, wherein the operations further comprise:

determining that the number of contact points has decreased during execution of the subsequent application function;

determining that the number of contact points is greater than zero; and continuing execution of the subsequent application function in response to determining that the number of contact points is greater than zero.

18. The system of claim 14, wherein determining that that the number of contact points has decreased comprises:

generating a current frame corresponding to the touchscreen;

retrieving a previous frame corresponding to the touchscreen from a computer-readable storage device; and comparing the current frame to the previous frame to determine a change in the number of contact points.

* * * * *